2,572,984

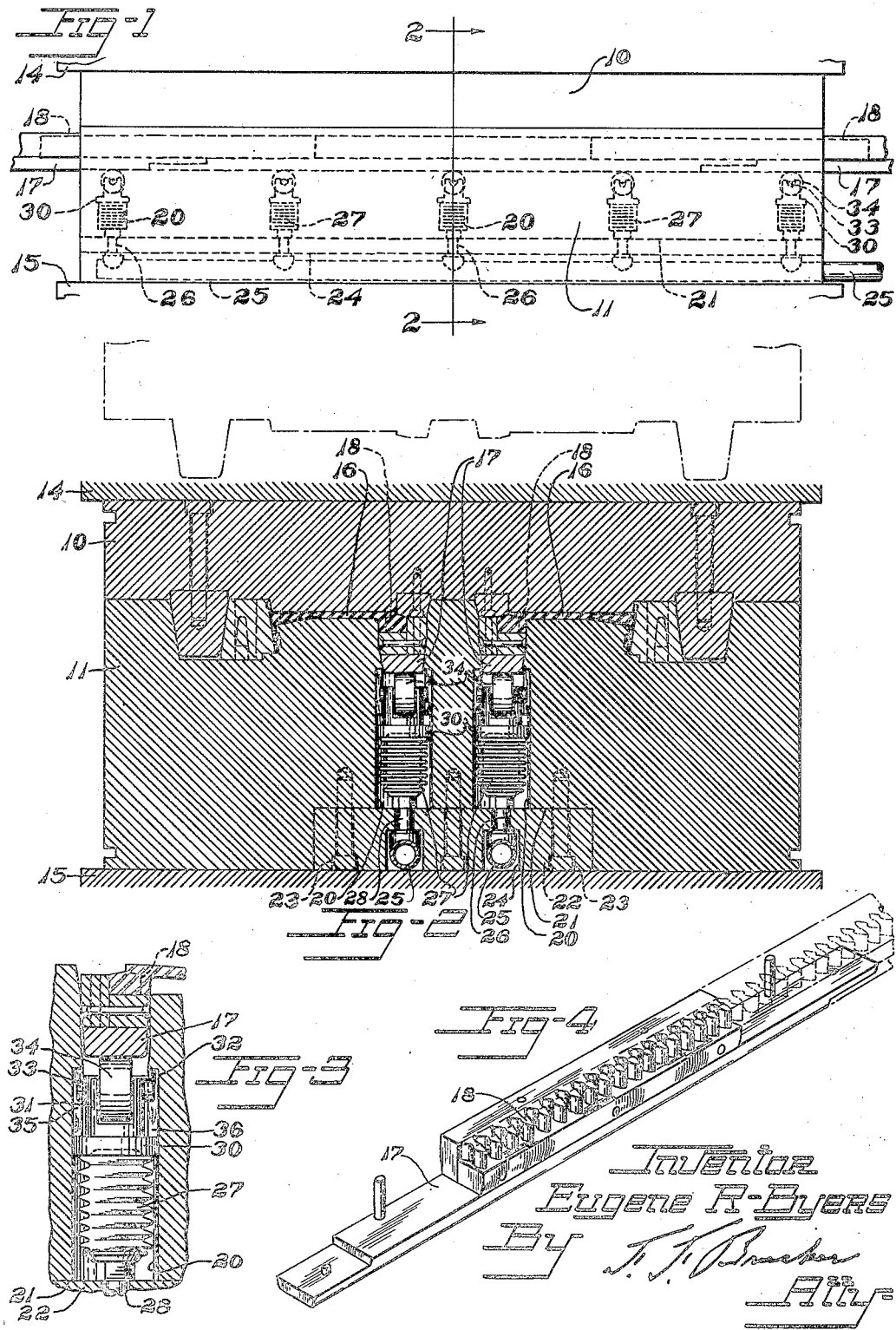
Oct. 30, 1951 — E. R. BYERS — 2,572,984
APPARATUS FOR EJECTING ARTICLES FROM MOLDS
Filed Aug. 14, 1948
Inventor
Eugene R. Byers Patented Oct. 30, 1951

UNITED STATES PATENT OFFICE 2,572,984

APPARATUS FOR EJECTING ARTICLES FROM MOLDS

Eugene R. Byers, Cuyahoga Falls, Ohio, assignor to The B. F. Goodrich Company, New York, N. Y., a corporation of New York Application August 14, 1948, Serial No. 44,363

3 Claims. (Cl. 18—2)

This invention relates to ejecting apparatus for molds and is particularly useful in providing a close operating space means for moving molded articles and mold parts from molds.

In the manufacture of molded articles of rubber-like material or similar moldable plastic materials it is often desirable to loosen and eject a portion of the article with or without a movable member of the mold while the mold is located in the curing press. The ejection of such articles or mold parts is difficult because of the limited space between the platens of the curing press. In molds in which long articles are molded step-by-step, it is difficult to move the long strip with or without movable mold parts along the mold cavity because of friction of the mold and the material.

Objects of the present invention are to provide powerful ejecting means within a limited space, to provide for operation by fluid pressure, to provide for reduction of friction in handling movable mold parts, and to provide for simultaneous lifting at a plurality of positions.

Other objects are to provide simplicity of structure and economy of operation.

These and other objects will appear from the following description and the accompanying drawings.

Of the drawings:

Fig. 1 is a side elevation of molding apparatus constructed in accordance with and embodying the invention.

Fig. 2 is a cross-sectional view thereof, taken on line 2—2 of Fig. 1, the open position of the upper mold plate being indicated in dot-and-dash lines.

Fig. 3 is a detail view of one of the ejector units.

Fig. 4 is a perspective view of the removable molding bars.

Referring to the drawings, which as a matter of convenience illustrate the invention as applied to the molding apparatus of the John A. Dorner application, Serial No. 693,943, filed August 30, 1946, now U. S. Patent No. 2,456,113, the numerals 10 and 11 designate respectively the top and bottom mold plates which are secured respectively to the top platen 14 and bottom platen 15 of a hydraulic press.

Through cavities 16 are formed between the mold plates whereby articles may be molded step-by-step from strip material. In the illustrated mold, a movable bar 17 is seated in a channel of the mold cavity and has tooth-molding elements 18 removably positionable thereon for molding spaced-apart fastener elements along the margin of the article. In use of this mold the bar 17 is advanced along the mold cavity step-by-step between molding steps and the bar 17 must be loosened from the mold groove and advanced therealong with the strip material.

For ejecting the mold bar 17 and the molded strip material from the mold cavity, the mold plate 11 is formed with a series of vertical openings 20 in alignment with the bar 17 at spaced intervals along the mold and extending from the mold cavity to a groove 21 extending lengthwise of the mold plate at its lower face. A bar 22 is fitted in the groove 21 and is secured therein by screws 23. The bar 22 has a groove 24 in its lower face for receiving a pipe 25 and also has reduced openings 26 therethrough in alignment with the openings 20. Mounted in each opening 20 is a sealed metallic longitudinally extendible capsule 27 having one end connected to the pipe 25 by a nipple 28 extending through the opening 26. Secured to the upper end of the capsule is a crosshead 30 having a pair of spaced-apart arms 31, 32 defining a slot therebetween. A cross pin 33 is mounted in the arms 31, 32 across the slot. A roller 34 is rotatably mounted about the pin 33 within the slot and engages the bottom of the bar 17. The ends of the pin 33 project into vertical grooves 35, 36 for holding the roller in alignment with the bar, and the grooves also limit vertical movement of the roller. The arrangement is such that when fluid under pressure is admitted through pipe 25 to the capsule 27 the rollers 34 and with them the bar 17 is lifted to free the bar from its retaining groove and the bar may then be moved lengthwise of the mold on the rollers 34 with a minimum of friction.

Variations may be made without departing from the scope of the invention as it is defined by the following claims.

I claim:

1. A mold for forming a strip article, said mold having a groove extending therealong, a molding cavity in communication with said groove, a bar fitting said groove and movable with the article step-by-step along said groove of the mold between molding operations, a series of openings connecting with said groove at positions therealong, expansible fluid-operated members each mounted in one of said openings, a roller carried by each member for contacting said bar for lifting it in said groove, and means for admitting fluid under pressure to said expansible members to advance them in unison.

2. Apparatus for molding a strip article of material step by step, said apparatus comprising a pair of separable mold plates, one of said plates having a groove extending throughout its length, a molding bar seated in a portion of said groove and moveable therealong with the strip article, said bar and said plates together defining an elongate mold cavity for forming the strip, a series of ejectors located at intervals along said groove for releasing said bar from said groove to permit sliding of the bar along said groove step by step between molding operations, fluid-operated means for operating said ejectors in unison, and roller means on said ejectors to reduce friction in moving said bar along said groove.

3. Molding apparatus comprising a mold having a molding cavity for forming an article, said mold having a groove extending therethrough in communication with said molding cavity for receiving a movable mold part, an elongate mold part seated in said groove and movable along said groove with the molded article between steps of a step-by-step molding operation performed on the article, a fluid pressure operated ejector mounted in said mold along said groove for loosening said mold part from said mold to permit such step-by-step movement and a roller carried by said ejector and contacting said mold part to reduce friction when moving said mold part along said groove.

EUGENE R. BYERS.

REFERENCES CITED

The following references are of record in the file of this patent:

UNITED STATES PATENTS

| Number | Name | Date |
|---|---|---|
| 1,720,357 | Willard | July 9, 1929 |
| 2,156,459 | Mucher | May 2, 1939 |
| 2,367,525 | Rempel | Jan. 16, 1945 |
| 2,442,246 | Peterson | May 25, 1948 |
| 2,456,113 | Dorner | Dec. 14, 1948 |